US007353881B2

(12) United States Patent
Akins et al.

(10) Patent No.: US 7,353,881 B2
(45) Date of Patent: Apr. 8, 2008

(54) GANGED FIRE EXTINGUISHER SYSTEM

(76) Inventors: Larry W. Akins, 5510 Washington Blvd., Indianapolis, IN (US) 46220; Walter Lisowski, 1145 Mistwood Pl., Downers Grove, IL (US) 60615

( * ) Notice: Subject to any disclaimer, the term of this patent is extended or adjusted under 35 U.S.C. 154(b) by 36 days.

(21) Appl. No.: 11/253,212

(22) Filed: Oct. 18, 2005

(65) Prior Publication Data

US 2006/0032641 A1    Feb. 16, 2006

(51) Int. Cl.
| | |
|---|---|
| A62C 37/36 | (2006.01) |
| A62C 35/02 | (2006.01) |
| A62C 37/10 | (2006.01) |
| A62C 37/00 | (2006.01) |
| F16K 17/38 | (2006.01) |

(52) U.S. Cl. .................. 169/19; 169/26; 169/56; 169/60; 137/68.12; 137/80

(58) Field of Classification Search .............. 169/19, 169/26, 56, 60, 16–18, 5, 20, 54, 57, 62, 169/65, 9, 30; 239/303, 304; 137/68.12, 137/80, 70, 72, 79
See application file for complete search history.

(56) References Cited

U.S. PATENT DOCUMENTS

| | | | |
|---|---|---|---|
| 2,753,944 A | 7/1956 | Kincaid | |
| 3,776,313 A | 12/1973 | DePalma | |
| 5,653,291 A * | 8/1997 | Sundholm | ..................... 169/20 |
| 5,954,138 A | 9/1999 | Gabriel | |
| 6,131,667 A | 10/2000 | Jasadanont et al. | |
| 6,341,616 B1 | 1/2002 | Taylor | |
| 6,708,772 B2 * | 3/2004 | Bermes | ....................... 169/19 |

* cited by examiner

*Primary Examiner*—Darren Gorman
(74) *Attorney, Agent, or Firm*—John A. Waters; Flynn Thiel Boutell & Tanis PC

(57) ABSTRACT

A non-electrically actuated ganged fire extinguisher system for use in an enclosure of a size larger than the capacity of a single pre-engineered fire extinguisher comprises at least two pre-engineered fire extinguishers positioned at spaced locations in the enclosure. An actuation valve is mounted on the outlet of each fire extinguisher. A fluid operated valve actuator for each valve retains the valve in a closed state when the actuator is pressurized and opens the valve when the actuator is depressurized. A vent line connects the valve actuators and provides fluid communication therebetween, such that the actuators are maintained at the same pressure state. At least one non-electrical temperature sensor is mounted in fluid communication with the vent line. The temperature sensor opens an outlet to the vent line and releases the pressure therein when the temperature in the vicinity of the sensor reaches a predetermined value indicative of a fire hazard. The release of pressure in the vent line in turn causes substantially simultaneous actuation of all fire extinguishers connected to the vent line.

8 Claims, 2 Drawing Sheets

GANGED FIRE EXTINGUISHER SYSTEM

CROSS-REFERENCES TO RELATED APPLICATIONS

This is a non-provisional application based on and claiming the filing priority of co-pending utility application Ser. No. 10/686,830, filed Oct. 16, 2003, which in turn is based on and claims the filing priority of provisional application Ser. No. 60/418,856, filed Oct. 16, 2002, the disclosure of which are incorporated herein by reference.

BACKGROUND OF THE INVENTION

The present invention comprises a ganged fire extinguisher system, wherein discreet fire extinguishers are connected together for simultaneous operation in response to a signal from a fire detection device.

Individual fire extinguishers used for extinguishing fires in an enclosure are usually limited in capacity to enclosures having a maximum size of about 1500 cubic feet. Such pre-engineered fire extinguishing systems can be used, for example, in an engine room in a boat. The size limitations of pre-engineered systems usually restrict the fire extinguishing systems to use in boats that do not exceed about 60 or 70 feet in length.

For enclosures that cannot be serviced by a single fire extinguisher, it is generally necessary to have what is known as a "piped" or "engineered" system wherein a custom fire extinguishing system is incorporated into the enclosure by means of pipes and nozzles that are fed by a single external source of fire extinguishing chemical. Such systems are very expensive and are substantially more expensive and more expensive to install than pre-engineered systems. For enclosures that are somewhat larger than the maximum enclosure size for a pre-engineered system (such as 1500-3000 cubic feet, for example) there is no cost effective solution.

One of the problems with developing a pre-engineered system employing multiple fire extinguishers for an enclosure larger than 1500 cubic feet is that simultaneous actuation is essential but Coast Guard regulations do not permit the use of electrical actuators (devices that generate sparks cannot be used where flammable gases may be present). Simultaneous actuation of separate fire extinguishers is a challenge using other types of actuation systems.

An object of the present invention is to provide a ganged fire extinguisher system wherein discreet extinguishers can be simultaneously actuated by non-electrical actuators.

SUMMARY OF THE INVENTION

The present invention comprises a non-electrically actuated ganged fire extinguisher system for use in an enclosure requiring the fire extinguisher capacity of at least two-preengineered fire extinguishers. In one embodiment, the system comprises at least two pre-engineered fire extinguishers positioned at spaced locations in the enclosure, each fire extinguisher comprising a tank filled with pressurized fire extinguishing agent and an outlet for discharging the agents.

An actuation valve is mounted on the outlet of each fire extinguisher, the actuation valve having a movable valve member that opens the valve when in an actuated state and closes the valve when in a deactuated state.

A fluid operated valve actuator is drivingly connected to each valve. The valve actuator retains the valve in a closed state when the actuator is pressurized and opens the valve when the actuator is depressurized.

A vent line connects the valve actuators and provides fluid communication therebetween, such that the actuators are maintained at the same pressure state.

At least one non-electrical temperature sensor is mounted in fluid communication with the vent line. The temperature sensor is responsive to temperature so as to become actuated and open an outlet to the vent line and release the pressure therein when the temperature in the vicinity of the sensor reaches a predetermined value indicative of a fire hazard. The release of pressure in the vent line in turn causes substantially simultaneous actuation of all fire extinguishers connected to the vent line. In one embodiment of the invention, the temperature sensor is a glycerin filled bulb type sensor that breaks and opens an outlet to the vent line when the temperature reaches a predetermined level indicative of a fire hazard (or other desired trigger temperature).

The present invention provides a completely non-electrical pre-engineered fire protection system for enclosures too large to be protected by a single fire extinguisher but too small to warrant the expense of a custom engineered system.

These and other advantages of the present invention will become apparent from the preferred embodiment of the invention described below and shown in the appended drawings.

DETAILED DESCRIPTION OF THE INVENTION

Figure 1:
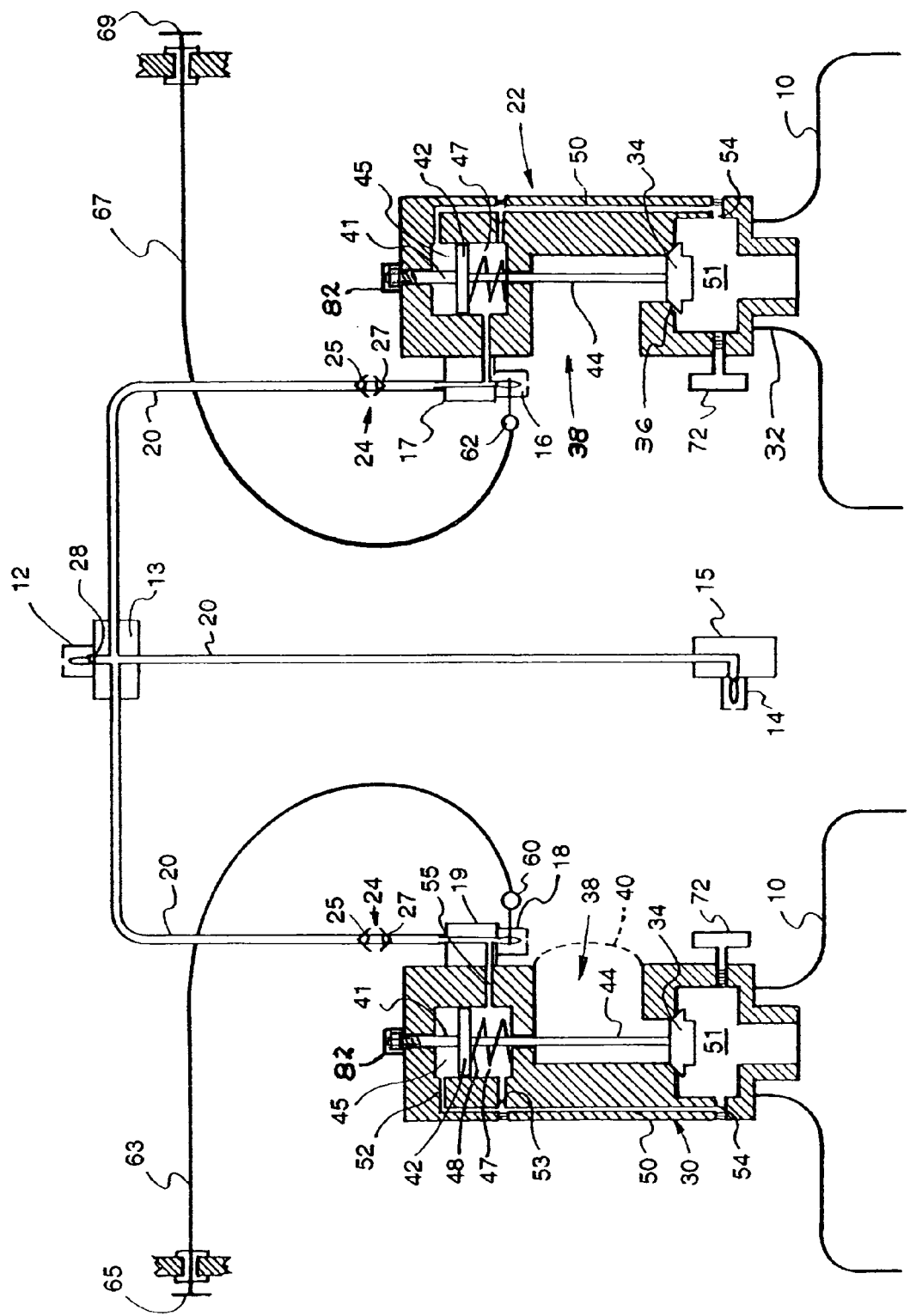
FIG. 1 is a diagram showing schematically the actuation of separate fire extinguishers by means of a non-electrical simultaneous actuation system in accordance with the present invention.
Figure 2:
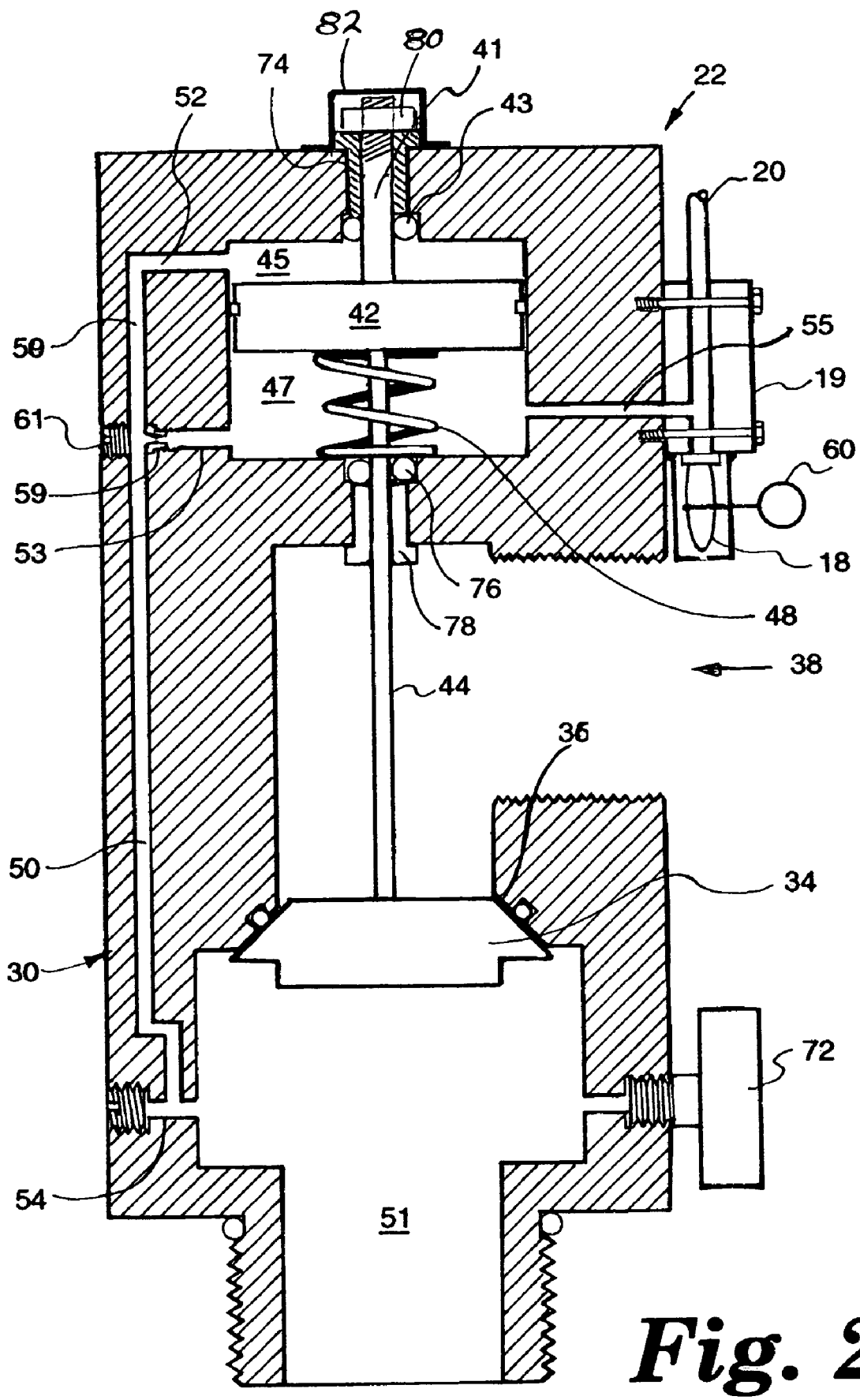
FIG. 2 is an enlarged sectional view of the valve of the present invention.

Referring to the drawings, an exemplary system comprises separate fire extinguishers 10 that are ganged together in accordance with the present invention in order to provide simultaneous actuation by any one of four separate actuators in the form of non-electrical bulb-type temperature sensors 12, 14, 16, and 18, which are mounted on manifolds or bulb holders 13, 15, 17, and 19, respectively. The bulb holders are connected together by small vent hoses 20, preferably ¼ inch flexible stainless steel hose. The vent hoses are connected to fire extinguisher actuation valves 22 by means of double zero leak quick connect connectors 24, with double check valves 25 and 27 preventing leakage from either the fire extinguisher or the vent hose when the connector is disconnected. The temperature sensors are conventional heat responsive bulb sensors of the type used in boats. Such sensors can be set to become actuated at about 175° or other desired actuation temperature. These sensors include a glycerin-filled bulb that blocks an outlet port in the bulb holder, such as outlet 28 in bulb holder 13. When the temperature reaches actuation temperature, the glycerin breaks the bulb and unblocks the outlet, venting the vent line to atmosphere. When the vent line is vented to atmosphere, both fire extinguishers are actuated by means of valves 22.

The means by which both fire extinguishers are actuated at the same time in response to the actuation of any temperature sensor is accomplished by means of valves 22 of the present invention. Each valve 22 includes a body 30 threaded or otherwise attached to the top 32 of the fire extinguisher. Valve 22 is a poppet-type valve wherein a poppet 34 closes extinguisher outlet 36 leading to valve outlet 38. The valve outlet can be connected to a piping system for conveying fire extinguishing agent elsewhere (such as to an outlet above an engine), or the fire extinguishers can be placed at opposite ends of a room and each fitted with a diffuser 40 (shown in phantom) that diffuses fire extinguisher agent directly as it is released from the fire extinguisher.

Poppet 34 is actuated by a piston 42 through a lower shaft 44 that extends through seal 76 and bushing 78 and interconnects the piston with the poppet. An upper shaft 41 extends upwardly from the piston and fits through a seal 43 and a bronze bushing 74 in the top of the piston chamber. The top end of shaft 41 is threaded. A nut 80 is threaded on a threaded upper end of shaft 41 to hold the valve in a closed position prior to installation and use. The nut is removed after installation. A removable cap 82 covers the upper end of shaft 41 and nut 80. Desirably, shaft 44 is smaller in diameter than shaft 41 (shaft 44 typically being about ¼ inch and shaft 41 being about ⅜ inches in diameter). The different diameters make the piston surface on the lower side greater than the piston surface on the upper side, so equal pressure on upper and lower sides of the piston produces a net upward force on the piston, urging the poppet closed.

The piston is reciprocally mounted in a chamber 46 and is biased in an upward position by means of a spring 48. A passage 50 in the valve body is connected at one end 54 to a valve inlet chamber 51 connected to the fire extinguisher outlet chamber. Chamber 51 is under constant pressure from the fire extinguisher, which is about 360 psi in the exemplary embodiment. The pressure is monitored by a pressure gage 72 that is in communication with chamber 51. The outer end of passage 50 is connected to ports 52 and 53 in piston chamber 46 on the upper and lower sides 45 and 47 of the piston chamber. Pressurized gas from the fire extinguisher pressurizes piston chamber 46 with equal pressure on both the upper and lower sides 45 and 47 of the piston by means of ports 52 and 53. Fire extinguisher pressure also pressurizes sensor 18 and valve bulb holder 19 by means of port 55 on the lower side of the piston. When none of the temperature sensors is activated, the balanced pressure on the upper and lower sides of piston 42 creates a net upward force on the piston, which urges the poppet closed and prevents venting through leakage. Spring 48 also urges piston 42 to the position shown in FIG. 1, wherein the poppet valve is closed and the fire extinguisher is deactuated.

When any temperature sensor bulb breaks, however, the portion of chamber 46 below piston 42 becomes vented to atmosphere, while pressure is maintained in the upper chamber. The pressure in the upper chamber drives the piston downwardly and opens the valve, releasing the pressurized fire extinguisher gases through outlet 38 and diffuser 40. A restrictive orifice 59 in lower port 53 prevents the upper chamber from being vented simultaneously through passage 50 and outlets 53 and 52 when lower side 47 is vented. A removable threaded orifice access plug 61 provides access to the orifice for service.

When one of the fire extinguishers is activated, the other fire extinguisher is simultaneously activated. This occurs because all of the vent lines 20 are vented at the same time whenever any one of the temperature sensor bulbs breaks. Thus, if the left valve shown in FIG. 1 actuates that fire extinguisher, the same pressure drop will cause the piston 42 to be driven downwardly in the right valve 22, thus actuating the other fire extinguisher simultaneously. The transmission of a pressure drop from one valve to the other is substantially instantaneous and is automatic, thus causing both fire extinguishers to discharge simultaneously in response to any one temperature sensor. This all occurs without the use of any electrical or electronic controls whatsoever and does not require the presence of a functioning electrical system.

In operation, with separate fire extinguishers placed at opposite ends of a room that is between 1500 and 3000 cubic feet in volume, whenever any one temperature sensor becomes actuated, both fire extinguishers discharge their entire contents automatically. The volume of a fire extinguisher is designed to fill the room and extinguish a fire within a certain size of room or enclosure. If a single fire extinguisher were to be discharged in a room that is too large for the fire extinguisher, the fire extinguisher contents might become too diffused to extinguish the fire. When two fire extinguishers are employed for a room that is within the size range of two fire extinguishers, the two fire extinguishers discharging automatically will provide enough fire extinguishing gas to extinguish the fire anywhere in the room.

Desirably, when used in connection with a room, such as an engine room in a boat, the two fire extinguishers are packaged with the vent hose and quick disconnects connected. The two fire extinguishers are removed from the packaging without disturbing the hoses or valves. One unit is placed on the front wall of the engine room and the other unit is placed on the rear wall of the engine room. Each unit is clamped in place. Then one quick disconnect is disconnected and the hose is securely mounted to the ceiling or other suitable location. Since the quick disconnects have zero leak double check valves, when the quick disconnect fitting is disconnected, a check valve on the vent port and a check valve in the hose ensure zero leakage of agent. After the hose has been connected to the ceiling, the quick disconnect is reconnected, thus arming the system. At all times the vent hose is pressurized. This avoids a pressure drop to fill the hose when the system is installed and provides a means for leak detection prior to installation.

The temporary nut 80 on the upper end of shaft 41 also provides an additional safety feature that prevents inadvertent actuation of the system prior to the completion of installation and testing. Nut 80 is threaded securely on shaft 41 and serves as a valve lock, locking the valve closed during shipment and prior to installation of the system. Thus, if there is a leak in the system or if the vent line becomes depressurized before the valve is connected to the pressurized fire extinguisher, the pressure differential or the pressure leak cannot inadvertently trigger the actuation of the fire extinguishers. Also, the safety locking nuts prevent inadvertent actuation of the system if one of the temperature sensors is dropped or otherwise becomes broken before the completion of installation. In the present invention, the components can all be installed, even separately if desired, and the whole system can be activated and pressurized and tested for pressure leaks before the nuts are removed from the ends of shafts 41. The nuts can then be removed, so that the system can thereafter be actuated by the temperature sensors. Cap 82 can be resiliently snapped over the end of the shaft and shaft opening for protection against abuse and contamination.

The system also can include manual actuator levers 60 and 62 mounted to bulb sensors. The actuators break the bulbs when manually actuated. The actuators can also include one or more conventional manual release cables connected to one or more of the sensor actuators for remote manual actuation of the extinguishers. Desirably, one cable 63 leads to a T-handle 65 positioned at the rear door to the engine room, while a second cable 67 leads to a T-handle 69 at the helm station of the boat. The fire extinguishers can be manually actuated by pulling either T-handle. Separate engine shut down controls are also employed in connection with the present invention in order to provide more complete safety in a marine environment.

In the preferred practice of the present invention, each valve bulb holder for a temperature sensor valve has a one quarter inch vent port, and the vent ports are connected by a one quarter inch high pressure vent hose 20 to the other valve bulb holder. These hoses insure that if any bulb breaks, the other valve bulb holder will vent at the same time.

It should be understood that the foregoing is merely exemplary of the preferred practice of the present invention and that various changes an modifications may be made in the arrangements and details of construction without departing from the spirit and scope of the present invention.

I claim:

1. A non-electrically actuated ganged fire extinguisher system for use in an enclosure requiring the fire extinguisher capacity of at least two pre-engineered fire extinguishers, the system comprising:
at least two pre-engineered fire extinguishers positioned at spaced locations in the enclosure, each fire extinguisher comprising a tank filled with pressurized fire extinguishing agent and an outlet for discharging the agent;
an actuation valve mounted on the outlet of each fire extinguisher, the actuation valve having a movable valve member that opens the valve when in an actuated state and closes the valve when in a deactuated state;
a fluid operated valve actuator for each valve, the valve actuator being drivingly connected to the valve and being operated by fluid pressure, the valve actuator retaining the valve in a closed state when the actuator is pressurized and opening the valve when the actuator is depressurized, at least one actuator being in fluid communication with the pressurized fire extinguishing agent in a tank so as to be pressurized thereby;
a vent line connecting the valve actuators and providing fluid communication therebetween, such that the actuators are maintained at the same pressure state; and
at least one non-electrical temperature sensor mounted in fluid communication with the vent line, the temperature sensor being responsive to temperature so as to become actuated and open an outlet to the vent line and release the pressure therein when the temperature in the vicinity of the sensor reaches a predetermined value indicative of a fire hazard, the release of pressure in the vent line in turn causing substantially simultaneous actuation of all fire extinguishers connected to the vent line.

2. A non-electrically actuated, ganged fire extinguisher system comprising a plurality of pre-engineered fire extinguishers operably interconnected by a pressurizable vent line, one or more non-electrical thermal sensors being connected in fluid communication with the vent line, the vent line being pressurized when in a deactuated state and outlet valves in the fire extinguishers being maintained in a closed condition when the vent line is pressurized, the one or more sensors releasing the pressure in the vent line when the one or more sensors are actuated by an excessive temperature condition, the release of pressure in the vent line causing the outlet valves to become actuated, releasing pressurized fire extinguishing agent from the fire extinguisher, the fire extinguisher system further including valve locks that secure the outlet valves in their closed conditions until the valve locks are manually released, the valve locks preventing inadvertent actuation of the fire extinguishers until the fire extinguisher system has been installed and activated.

3. The fire extinguisher system defined in claim 2 wherein the outlet valves further include a poppet and an extinguisher outlet, the poppet and the extinguisher outlet cooperating in the closed condition to contain the pressurized fire extinguishing agent, and wherein the vent line is operatively connected with the poppet whereby the poppet is biased toward the closed condition when the vent line is pressurized.

4. The fire extinguisher system defined in claim 3 wherein the poppet is connected with a shaft, the shaft having a length and being slidable along the length to a valve open position from the valve closed condition, and wherein the valve lock engages the shaft and holds the shaft in the valve closed condition, the valve lock being releasible to permit the valve to open.

5. The fire extinguisher system defined in claim 2 wherein the outlet valves further include a poppet and an extinguisher outlet, the poppet and the extinguisher outlet cooperating in the closed condition to contain the pressurized fire extinguishing agent, wherein the poppet is connected with a shaft, the shaft having a length and being slidable along the length to a valve open position from the valve closed condition, the shaft also having a screw threaded end, the valve lock comprising a cooperating screw threaded nut that engages the shaft and secures the valve in the closed condition by tightening the nut.

6. The fire extinguisher system defined in claim 1 further including a valve lock that secures the actuation valve in the deactuated state, the valve lock being releasible so as to permit the actuation valve to be actuated by the temperature sensor.

7. The fire extinguisher system defined in claim 1 wherein the movable valve member is connected with a shaft, the shaft having a length and being slidable along the length to the actuated state from the deactuated state, and wherein the system further includes a valve lock that engages the shaft and holds it in the deactuated state until the valve lock is manually released.

8. The fire extinguisher system of claim 6 wherein the movable valve member is connected with a shaft, the shaft having a length and being slidable along the length to the actuated state from the deactuated state, the shaft also having a screw threaded end, and wherein the system further includes a cooperating screw threaded nut that engages the shaft and secures the valve in the deactuated state, the shaft being releasible so as to permit movement to the actuated state by releasing the nut.

* * * * *